United States Patent [19]

Stumpf

[11] 3,816,228

[45] June 11, 1974

[54] ELASTIC NONWOVEN FABRIC

[75] Inventor: Robert J. Stumpf, Appleton, Wis.

[73] Assignee: Kimberly-Clark Corporation Neenah, Wis.

[22] Filed: July 19, 1972

[21] Appl. No.: 273,040

Related U.S. Application Data

[60] Division of Ser. No. 820,224, April 29, 1969, Pat. No. 3,687,754, which is a continuation-in-part of Ser. No. 769,959, Oct. 23, 1969, abandoned.

[52] U.S. Cl............ 161/63, 156/72, 156/183, 156/290, 161/66, 161/146, 161/148, 161/156
[51] Int. Cl............................................ D04h 11/00
[58] Field of Search ............... 161/63, 66, 146, 148; 156/72, 183, 290

[56] References Cited
UNITED STATES PATENTS

| | | | |
|---|---|---|---|
| 2,550,686 | 5/1951 | Goldman | 156/471 |
| 2,639,250 | 5/1953 | Reinhardt | 161/65 |
| 3,047,444 | 7/1962 | Harwood | 156/291 |
| 3,327,708 | 6/1967 | Sokolowski | 156/290 |
| 3,553,064 | 1/1971 | Wideman | 161/59 |
| 3,553,065 | 1/1971 | Stumpf | 161/59 |

Primary Examiner—George F. Lesmes
Assistant Examiner—James J. Bell
Attorney, Agent, or Firm—Wolfe, Hubbard, Leydig, Voit & Osann, Ltd.

[57] ABSTRACT

An elastic, high-loft nonwoven fabric with a discontinuous backing layer of adhesive and a multiplicity of heat-set elements looped outwardly from the backing and a method of making the fabric by first embedding a web of elements in an open pattern of adhesive, partially consolidating the adhesive into a backing layer while looping the elements outwardly from the backing and heat-setting the elements while minimizing bonding in the partially consolidated adhesive backing.

9 Claims, 34 Drawing Figures

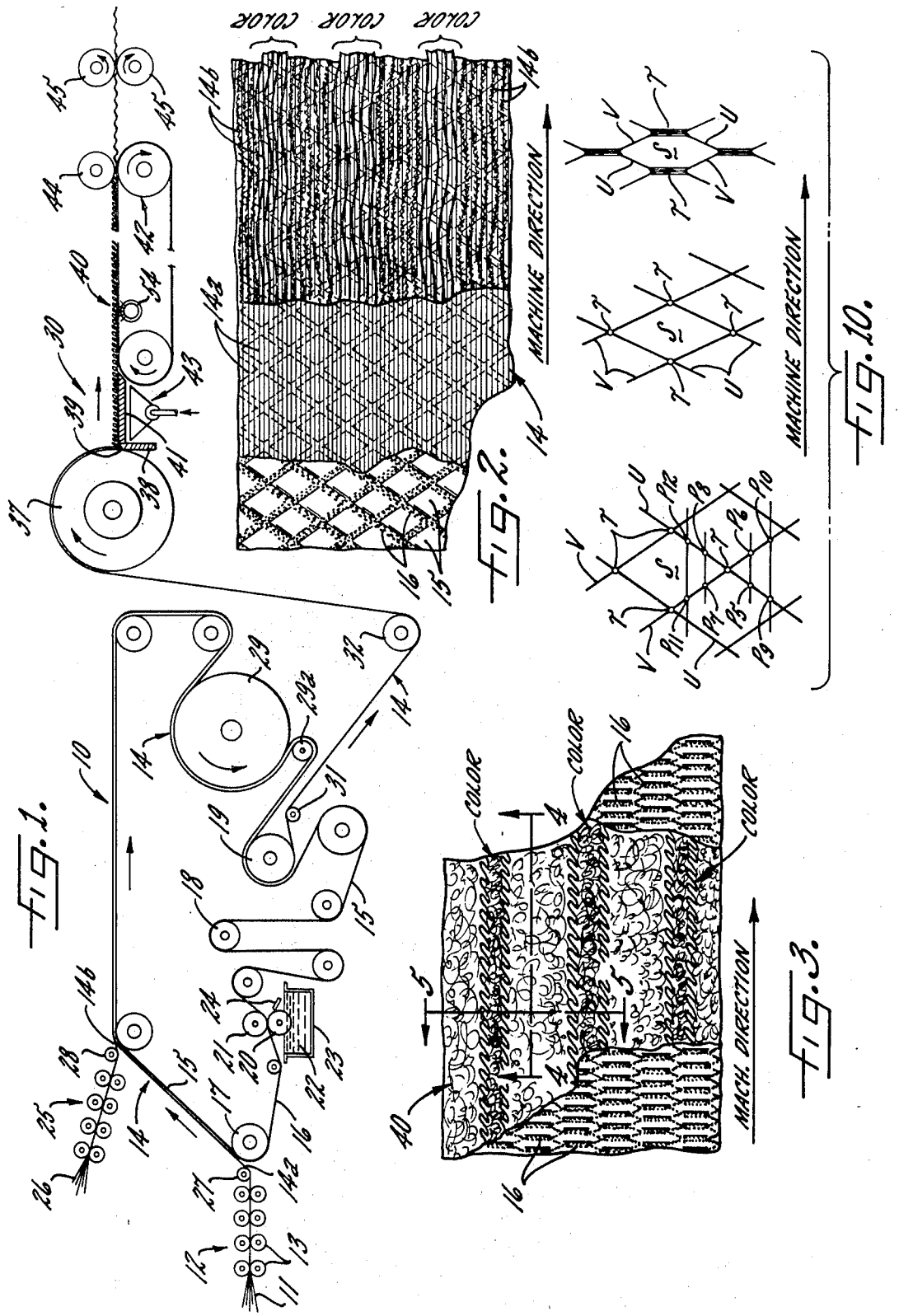

Fig. 19.
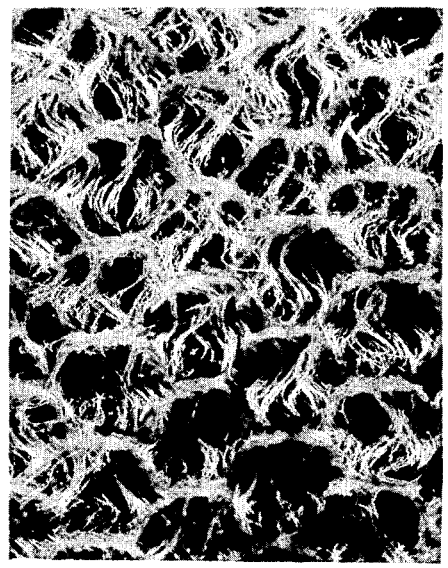
Fig. 20.

Fig. 29.
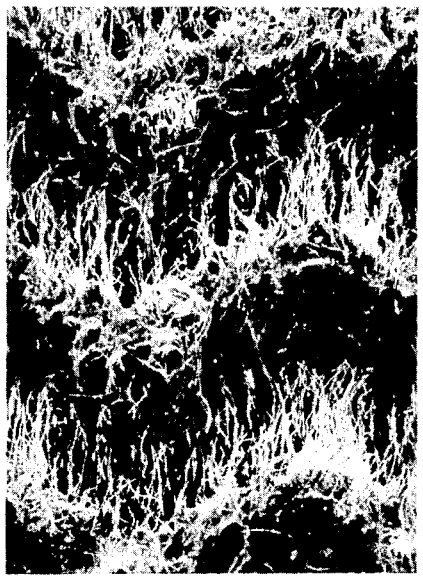
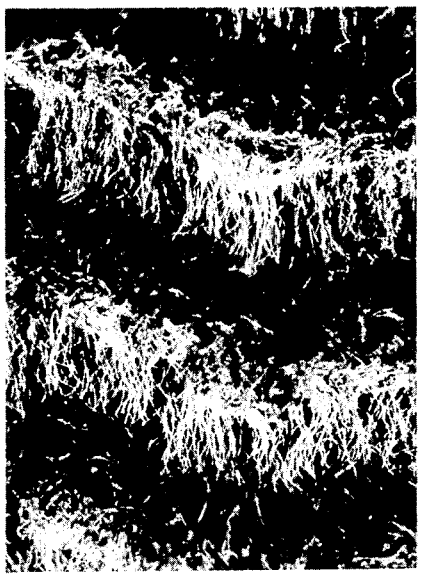
Fig. 30.

ELASTIC NONWOVEN FABRIC

RELATED APPLICATIONS

Robert J. Stumpf, U.S. Pat. Ser. No. 769,959, filed Oct. 23, 1968, and now abandoned.

DESCRIPTION OF THE INVENTION

This is a division of U.S. Pat. application Ser. No. 820,224, filed Apr. 29, 1969 now U.S. Pat. No. 3,687,754, which is a continuation-in-part of U.S. Pat. application Ser. No. 769,959, filed Oct. 23, 1969, and now abandoned.

This invention relates to a method of making an elastic, high-loft nonwoven fabric and to the products formed by such method.

In recent years many different types of nonwoven materials have been produced both to replace conventional woven fabrics and also to create new markets in which woven fabrics have not yet become established. This is particularly true in the case of material for single-use and disposable products, such as: sanitary supplies, hospital garments, and disposable sheets and the like. For these applications the nonwoven fabric is generally made in continuous sheet form with one or more layers of staple length fibers and/or a reinforcing scrim structure adhesively bonded together or laminated between plies of other material such as cellulosic wadding and plastic sheeting. The fibers may be natural, synthetic or various blends and, of course, the particular composition of the nonwoven fabric is greatly influenced by its intended use.

Exemplary of such nonwoven fabrics are those disclosed in U.S. Pat. Nos. 2,902,395, 3,047,444, 3,072,511, 3,327,708, 3,553,064, 3,553,065 and 3,484,330, and co-pending U.S. Pat. application Ser. No. 498,929, now abandoned and replaced by U.S. Pat. Ser. No. 79,287 filed Oct. 8, 1970, all of which are assigned to the same assignee as the present application.

While the products disclosed in the foregoing issued patents and pending applications have many different attributes and characteristics, they all have one thing in common, namely, the principal fibers are nearly all disposed substantially parallel to the surfaces of the nonwoven material. The result is that the material is either relatively thin and flat or that such substantial thickness and surface texture as are imparted to the fabric are provided by creping or embossing various layers of the material or, in some instances, the final nonwoven fabric.

In my co-pending U.S. Pat. application, Ser. No. 31,225 now U.S. Pat. No. 3,709,768 there is disclosed a method for forming a high-loft nonwoven material with a pleasing surface texture and appearance. This method obviates the need for employing creping, embossing or other texturing operations to improve the aesthetics of the material. The fabric is made by first embedding a web of fibers in an open pattern of adhesive and then at least partially consolidating the adhesive into a substantially continuous backing layer while looping the fibers outwardly from the backing.

It is a primary aim of the present invention to provide a high-loft nonwoven material having the pleasing aesthetic properties hereinbefore described and which is further characterized by a high degree of stretchability and elasticity, particularly in the machine direction.

It is a further object to provide a simple and economical method for forming an elastic nonwoven material of the hereinbeforedescribed type.

A still further object is to provide a method of forming an elastic nonwoven material in a compact, closed form which may be subsequently opened when desired.

Yet another object is to provide a method as described above which permits blending together fibers of differing colors or other characteristics in the initial web in order to achieve an elastic, high-loft, nonwoven fabric having a colored pattern or other appearances and texture characteristics.

Other objects and advantages of the method of making and the resulting product of the present invention will become more readily apparent upon reading the following detailed description and upon reference to the attached drawings in which:

FIG. 1 is a schematic side elevation of one form of apparatus which may be employed to practice the method of the present invention;

FIG. 2 is a fragmentary view of an illustrative web of base material, somewhat simplified and exaggerated for the sake of clarity of illustration, with portions broken away to expose the various layers;

FIG. 3 is a fragmentary plan view of one embodiment of the product of the present invention;

Figure 4:
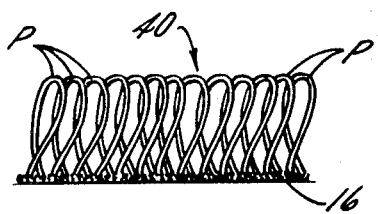
Figure 5:
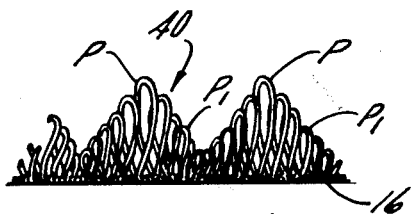
Figure 6:
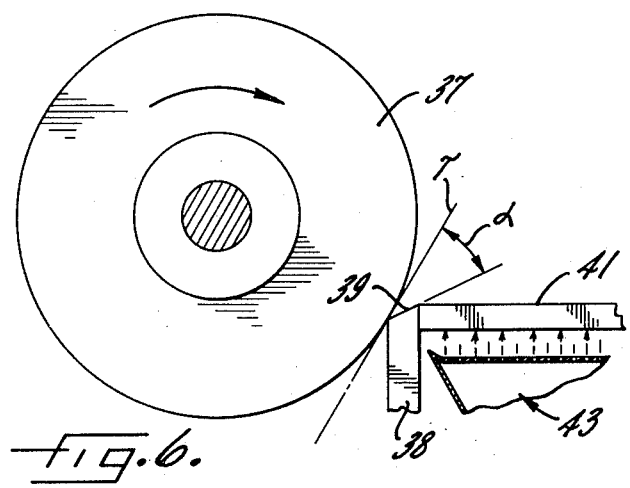
Figure 8:
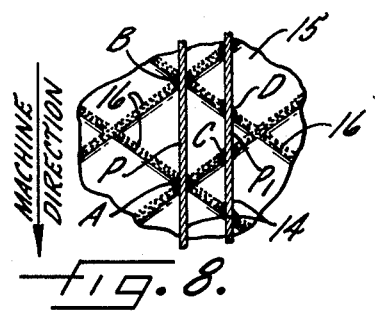
Figure 9:
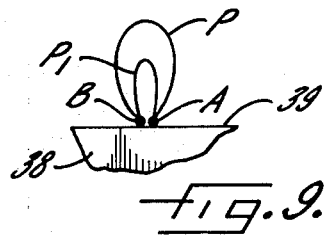
Figure 7:
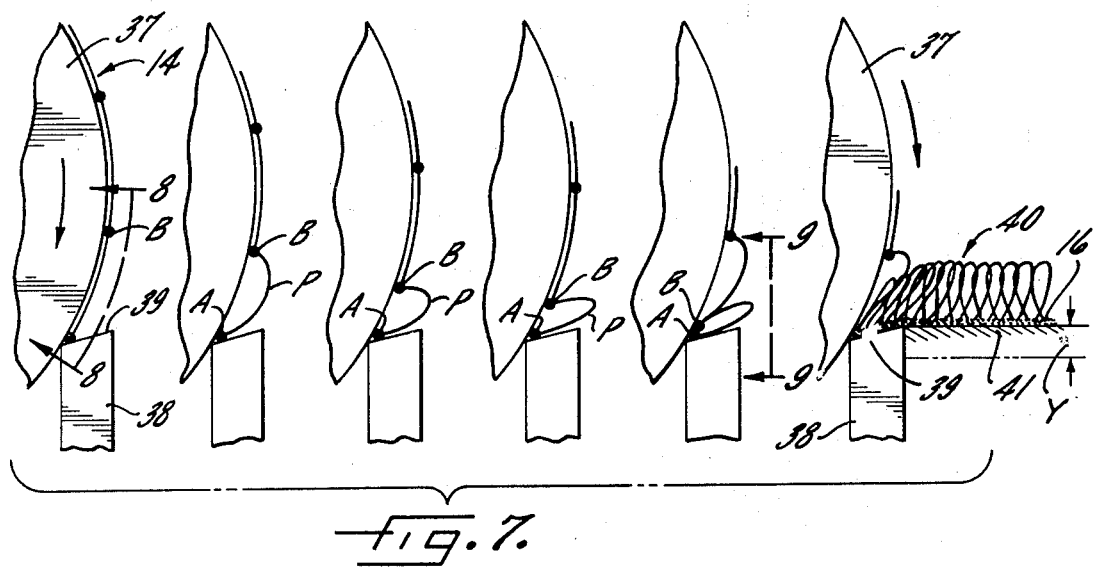

FIGS. 4 and 5, respectively, are greatly enlarged, simplified and somewhat exaggerated sections taken along the longitudinal lines 4—4 and transverse lines 5—5 in FIG. 3;

FIG. 6 is an enlarged schematic detail in side elevation of the forming drum and gathering blade of the apparatus shown in FIG. 1;

FIG. 7 is a further enlarged schematic side elevation illustrating in somewhat idealized fashion the sequence of gathering and looping of individual fibers;

FIG. 8 is an enlarged schematic fragmentary view taken along the lines 8—8 of FIG. 7 showing a fragment of the fiber web and adhesive pattern with illustrative fibers attached to the adhesive;

FIG. 9 is a simplified schematic view taken along the lines 9—9 of still another sequence as shown in FIG. 7;

FIG. 10 is an enlarged schematic bottom view showing the sequence of the partial consolidation or closing of the open adhesive pattern to form a discontinuous adhesive backing;

FIGS. 11 through 14, respectively, are enlarged photomicrographic reproductions of a longitudinal (machine direction) sectional view, a transverse (cross direction) sectional view, a top view and a bottom view of a sample of one form of the elastic, high-loft, nonwoven material of the present invention in its closed form where the fiber loops have turned perpendicular to the original fiber alinement;

FIGS. 15 through 18, respectively, are enlarged photomicrographic reproductions of the corresponding views of the sample of FIGS. 11 through 14 showing the elastic nonwoven material in its drawn or open position;

FIGS. 19 and 20, respectively, are enlarged photomicrographic reproductions of the top and bottom view of the sample of FIGS. 11 through 18 and illustrating the elastic nonwoven material in a stretched (machine or longitudinal direction) condition;

FIGS. 21 through 30 are enlarged photomicrographic reproductions which correspond to the views of FIGS. 11 through 20 and illustrating a sample of another form of the elastic, high-loft, nonwoven material of the present invention wherein the formed fiber loops remained in the original alinement of the fibers; and FIGS. 31 through 34 illustrate, in plan view, alternative adhesive patterns for the base web.

In practicing the method of the present invention in its preferred form, a base web of fibers is first prepared and an open adhesive pattern is applied to one side of the web.

Different procedures have been used in preparing the base web. For example, textile length fibers may be processed through conventional cotton card machinery to produce a carded web for the base web. In such a carded web 50 to 70 percent of the fibers may be oriented substantially parallel with the machine direction; it has been found, however, that a product having superior stretchability and elasticity has been obtained with the method of the present invention by using base webs having a higher percentage of the fibers alined with the machine direction, such as a highly drafted web in which, as a result of the drafting process, 80 to 95 percent of the fibers may be alined with the machine direction. Such webs of bonded, highly drafted fibers, of course, have substantial utility in themselves and are the subject, for example, of co-pending U.S. Pat. application Ser. No. 79,287 and U.S. Pat. No. 3,553,065 therefor.

Broadly stated, the method of the present invention involves taking the base material formed with heat-settable elements such as fibers and performing the subsequent steps of reactivating the open pattern of adhesive in which the fibers are embedded, partially consolidating the adhesive into a backing layer while looping the portions of the fibers across the open spaces of the adhesive outwardly from the backing layer and then heat-setting the fibers while minimizing the bonding in the partially consolidated adhesive backing. The resulting product is characterized by the high-loft or deep pile of the loops of fibers which extend outwardly from the adhesive backing and stretchability and elasticity in all but the cross direction. In some cases, the material of this invention may be stretched (machine direction) up to two or more times its opened or equilibrium length with recoverability of between 80 and 100 percent. These characteristics, of course, depend upon a combination of control parameters including, for example, the type and denier of the base fibers; the amount and spacing of the original adhesive pattern; the blade edge angle (i.e., — the angle formed between the blade edge and a line T tangent to the surface of the drum as shown in FIG. 6); the cooling of the fibers and the relative speeds of delivery to and discharge of the fibers from the gathering blade as will be discussed below.

In addition, the present method also contemplates, in some instances, additional steps, such as blending together fibers of different colors or other characteristics in the base web in order to achieve colored patterns or different surface textures and appearances in the final product. These additional steps will also be discussed below, following the detailed description of the overall method taken in connection with the drawings.

Turning now to the drawings, FIG. 1 schematically illustrates the apparatus for performing the method of the present invention in its preferred form. This apparatus includes a web forming section 10 and an adhesive compacting and fiber looping section 30. The web forming section 10 is generally similar to the apparatus disclosed in previously mentioned co-pending U.S. Pat. application Ser. No. 79,287 and U.S. Pat. No. 3,553,065. However, it should be appreciated that fiber webs made in accordance with the methods disclosed in either of the above-mentioned applications also are usable with the subsequent method steps of the present invention, as are carded webs and webs prepared by other processes, as will appear form the following.

As shown in FIG. 1, multiple slivers 11 of heat-settable textile fibers are drawn from their respective supply cans (not shown) into a draw frame 12 which comprises a series of pairs of grooved rolls 13, the rolls of each pair being driven by appropriate gearing well known in the art, at a peripheral rate of speed slightly faster than the rate of operation of the preceding pair. As the juxtaposed slivers pass through draw frame 12, the individual fibers are drafted and spread out to form a flat striated web of substantially alined fibers as shown at 14. Web 14 is maintained adjacent a supporting conveyor sheet 15 on the surface of which a patterned adhesive has been previously applied.

In this embodiment the conveyor sheet 15 comprises an endless conveyor belt treated on at least its upper surface with a release agent. One example of such a belt comprises woven glass fiber with a surface coating of tetrafluoroethylene resin. Other release coatings are well known, and comprise such materials as silicones, fatty acid metal complexes, certain acrylic polymers, and the like. Heat resistant films or thin metal sheets treated with release agents may also be used as the carrier sheet.

Prior to the time the web 14 is picked up by the belt 15, the latter has imprinted on its release-treated surface a pattern of flexible thermoplastic adhesive such as is shown at 16 in FIG. 2. It is understood that the adhesive is actually on the underside of belt 15 which becomes the upper surface after passing around roll 17 whereby the adhesive pattern 16 directly contacts the fiber web 14. The pattern is shown as being visible in FIG. 2 only for illustrative purposes.

The belt 15 is fed around roll 17 at a speed slightly in excess of the delivery speed of the final pair of rolls 13 in order to maintain web 14 under slight tension whereby the individual highly drafted fibers are retained in their alined and tensioned condition. Drive rolls 18, 19 are rotated to drive belt 15 at a speed sufficient to maintain the proper tension on the web 14.

In the method shown for applying adhesive, the belt 15 is fed through a nip formed between a printing roll 20 and a back-up roll 21 maintained in very light pressure engagement therewith. The surface of printing roll 20 is provided with an intaglio pattern which picks up adhesive 22 from dip pan 23. Part of the adhesive thus applied is removed by a doctor blade 24 leaving only the intaglio patterned surface filled. The printing roll 20 then transfers this metered amount of adhesive in a preselected pattern to the underside of release coated belt 15. The pattern shown in FIG. 2 is in the form of an open diamond pattern of adhesive.

Since the surface of belt 15 is treated with a release coating, the adhesive remains substantially on the surface with no penetration therein and is preferably in a somewhat tacky condition. The printed belt is drawn from the printing nip around roll 17 positioned closely adjacent the output end of draw frame 12, and, as stated above, at a speed slightly in excess of the delivery speed of the last two rolls in the draw frame. The web 14 emerging from the draw frame 12 is deposited on the tacky adhesive 16 on belt 15 and held in tensioned engagement therewith by the adhesive and the above-mentioned speed differential. This continuous tension prevents the fibers in the web from losing their highly drafted and alined condition.

If desired, additional alined and highly drafted fibers may be added to the web 14 on the adhesively printed belt 15. For this purpose a second draw frame 25 similar to the draw frame 12 is provided to draw additional slivers 26 of fibers from their supply cans (not shown) and, after drafting and alining them, deposit the fibers on the moving web 14 carried by the belt 15. In such cases, the amount of adhesive printed on the belt 15 is increased so that some penetrations of the adhesive pattern reach the fibers from the second draw frame 25 and, together with the speed differential of the belt 15 relative to the last pair of rolls in the draw frame 25, maintains these fibers under slight tension whereby they also maintain their highly drafted and alined condition.

The fibers deposited on the web 14 from draw frames 12 and 25 need not be the same kind, size, color or quantity, nor for that matter do the fibers of the slivers 11 and 26 need to be uniform in these respects as they are drawn into the draw frames 12 and 25. Thus various blends of fiber sizes, kinds, colors and quantities can be deposited across the web 14 from each of the draw frames 12 and 25 and in various combinations of first and second layers of fibers. Additional draw frames can also be employed if desired.

Further, the fibers from each of the draw frames 12 and 25 pass under respective bars 27 and 28 before being deposited on the belt 15. Each of the bars 27, 28 may be optionally oscillated in a direction generally transverse to the movement of the web 14 and preferably, provision is also made for controlling the frequency and amplitude of oscillation one bar relative to the other. Thus, as each bar is oscillated, the fibers deposited from the respective draw frame take on a generally sinusoidal or saw tooth wave pattern of controlled frequency and amplitude. A simple, but somewhat similar oscillating bar arrangement is disclosed in previously mentioned U.S. Pat. No. 3,553,065. However, the single bar arrangement there disclosed did not afford nor even contemplate the significantly improved attributes made possible by the present invention.

An example of the web 14 formed by the apparatus 10 is shown in FIG. 2. As previously mentioned, a series of parallel and diagonally disposed lines of adhesive are printed in criss-cross fashion on the belt 15 to form pattern 16 of adhesive having substantial open spaces in the configuration of diamonds. In depositing the fibers from the first draw frame 12, in this instance, the bar 27 was not oscillated. Thus, the fibers making up the first component 14a of the web 14 are substantially all alined in the direction of web movement. The fibers making up the second component 14b of the web, however, will be seen to be deposited in a generally wavy or saw tooth pattern as a result of oscillation of the bar 28 associated with the second draw frame 25. It should be appreciated, of course, that FIG. 2 is only intended to be illustrative, and, while the lines representing the fibers for both components 14a and 14b are spaced apart for clarity, in practice the high-drafted fibers of both components are very close to one another.

Also for illustrative purposes, it will be noted that web component 14b has three bands of fibers designated color. These bands of fibers may be the same or different colors; but, in any event, they differ from the color of the balance of the fibers of web component 14b. Further as previously mentioned the fibers of web component 14b may differ from those of component 14a in kind, size, color or quantity depending on the desired color pattern and surface characteristics of the final product as more specifically described below.

Following deposit of web components 14a and 14b on the adhesive printed belt 15, the belt is drawn around a heated drum 29 where fusing and curing of the adhesive is substantially completed while the web 14 is maintained in firm contact therewith to bond the individual fibers. To insure effective heating and fusing of the adhesive, it is desirable that travel of the combined belt and web be around a substantial portion of the drum 29. In the illustrated embodiment, a fly roll 29a is disposed to provide wrap for the combined belt and web as they travel around the drum 29 to insure complete embedment of the fibers in the adhesive. The fibers of the web 14 are thus bonded together while retaining their highly drafted and substantially alined condition in the particular pattern in which they were deposited on the open pattern of adhesive 16 printed on the belt 15.

After leaving the fly roll 29a, the combined web 14 and belt 15 are preferably passed over the drive roll 19 which also serves as a cooling drum, to cure and set the adhesive. The bonded web 14 is stripped from the release coated surface of the belt 15 by the guide roll 31 as the web leaves the cooling drum 19.

In general, any of the various known adhesives may be employed. It should, however, be appreciated that the particular adhesive used is dependent upon the characteristics of the flexible heat-settable element that is being employed, i.e. — the adhesive should be reactivatable and softened in the heat-setting range of the particular flexible element being used. In addition, the adhesive should also: be applicable to the base web 14 by procedures which will not disarrange the fibrous structure of the web; be reactivatable in the subsequent adhesive gathering and partial consolidation stage of the process; and form a flexible discontinous backing layer for the finished fabric and should strongly bond the fiber loops in place.

While various well-known adhesives may be employed in the foregoing process, advantages reside in the use of plastisols, which are colloidal dispersions of synthetic resins in a suitable organic ester plasticizer, and which under the influence of heat provide good binding power while remaining soft and flexible. While many adhesives of this type are known, those found particularly useful for incorporation in the product of this invention include vinyl chloride polymers, and copolymers of vinyl chloride with other vinyl resins, plasticized by organic phthalates, sebacates, or adipates. These provide a fast curing plastisol adhesive characterized by relatively low viscosity, low migration tendencies, and minimum volatility. Such adhesives remain soft and flexible after curing, and can be reactivated by subsequent heating.

It has been found that other adhesive systems may be employed in the process, such as organisols, utilizing resins such as the vinyl chloride polymers, and copolymers. Furthermore, other adhesives may be employed provided that they satisfy specified characteristics in the base web produced in the web forming stage, and in the finished fabric produced in the adhesive compacting and fiber looping stage. For example, emulsions of thermoplastic resins such as acrylics and rubber-like compounds, illustratively ABS, have the requisite properties to serve as the bonding adhesive for the web 14.

The base material made as heretofore described and comprising a web of highly drafted, heat-settable, fibers embedded in an open adhesive pattern, is then fed into the adhesive consolidating and fiber looping section 30 of the apparatus shown in FIG. 1. As shown here, the web 14 continues directly from the web forming section 10 to the consolidating and looping section 30. It should be appreciated, however, that the web 14 discharged from section 10 could be rolled up for storage or transport and then subsequently unrolled and fed into section 30. Also, as previously mentioned, webs such as those made in accordance with the method disclosed in the other previously identified co-pending applications can be further processed in section 30 in keeping with the method of the present invention. The web 14 while still under tension is fed around an idler roll 32 and onto the surface of a heated forming drum 37.

In accordance with one aspect of the present invention, the forming drum is maintained at a temperature which will soften the adhesive to a tacky state so that it adheres to the drum surface while also heating the fibers sufficiently to bring them into their heat-setting range. In its preferred embodiment the drum 37 is made of metal with a highly polished chromium plated surface which is internally heated. Also, the web 14 is desirably arranged to travel a substantial distance around the drum 37 (i.e. — have a relatively high degree of wrap) with the open pattern of adhesive 16 in contact with the heated drum surface to provide adequate residence time.

As the web 14 is fed onto the drum 37 the heat from the drum surface raises the fibers into their heat-setting temperature range and reactivates and softens the adhesive printed on the underside of the web causing it to become tacky and to adhere slightly to the drum surface thereby maintaining the web under constant tension. The drum temperature, should be maintained below the melting point of the adhesive to prevent dispersion of the adhesive into the fibers of the web and to minimize bonding of the adhesive lines as will hereinafter be described in greater detail.

Pursuant to the present invention the web of fibers and softened adhesive is reformed by the cooperative action of the drum 37 and a gathering blade 38 having a flat edge 39. The blade edge 39 operates to consolidate the open adhesive pattern 16 into a backing layer of adhesive while simultaneously looping the fibers of the web outwardly from between the open spaces in the original adhesive pattern. The reformed and consolidated material 40 then leaves the blade edge 39 and onto a flat take-off surface 41 and a discharge conveyor 42.

In accordance with an important aspect of this invention the speed at which the material leaves the gathering blade is closely coordinated with the surface speed of the drum to heat-set the fibers in their looped positions while rendering the adhesive non-tacky so the consolidation of the adhesive will only be partial and the bonding of transverse lines of adhesive minimized. To this end and as shown in FIG. 1, this may be accomplished by maintaining the take-off surface 41 at the ambient temperature or slightly higher by directing an air spray 43 at the bottom surface of take-off surface 41. While this has provided adequate cooling to carry out the objectives of the conditioning step, it should be appreciated that, if desired, other means such as a water spray or a refrigerated fluid could be employed to provide a lower temperature if desired. Indeed, as long as the fluid was inert as regards the fibers and adhesives, application could be directly on the partially consolidated and reformed web. The take-away speed should then be set so that, at the temperature of the take-away surface, the fibers will be heat-set and yet the bonding of merging lines of adhesives will be minimized. In this connection, it should be noted that the adhesive should be maintained below its melting point to minimize the flowing together of the merging adhesive lines which would provide undesired bonds.

Turning now to FIGS. 7 through 10, the method of making the elastic, high-loft, nonwoven fabric 40 will be explained in greater detail in connection with an illustrative sequence of the gathering and looping of a single fiber of the web 14 (FIGS. 7 through 9) and the partial consolidation of the illustrative diamond adhesive pattern 16 (FIG. 10). As seen in FIG. 8, the fiber has a portion P which extends across the open space of the diamond pattern of adhesive 16 from point A to point B where it is embedded in the adhesive. Referring to FIG. 7, the series of views in this Figure illustrates how the portion P of the fiber is formed into a loop; when point A being carried around the heated drum 37 impinges against the gathering blade edge 39, its forward motion is halted and it is scraped along the surface of the drum. Point B continues to advance with the drum surface since due to its softened and tacky condition it adheres to the smooth drum surface.

As point B advances relative to point A, the portion P of the fiber between points A and B is caused to bow outwardly from the drum surface. Finally, point B overtakes point A and these points of adhesive are brought close together without being consolidated as seen in FIG. 9. In the meantime, fiber portion P has been looped outwardly from the drum surface. While this is occurring, of course, additional adhesive points C–D, etc., travelling around the drum 37 impinge against the gathering blade edge 39 causing a consolidation of these adhesive points and looping of their intermediate fiber portions $P_1$ as is also indicated in FIG. 9. This occurs simultaneously at all points across the web at the blade edge producing a backing layer of adhesive from which extends the multiplicity of loops formed by the fibers of the base web. The layer of adhesive is carried away from the blade edge along the take-off surface 41 and provides a backing layer for the outwardly looped fibers, thus producing the fabric 40.

Figure 11:
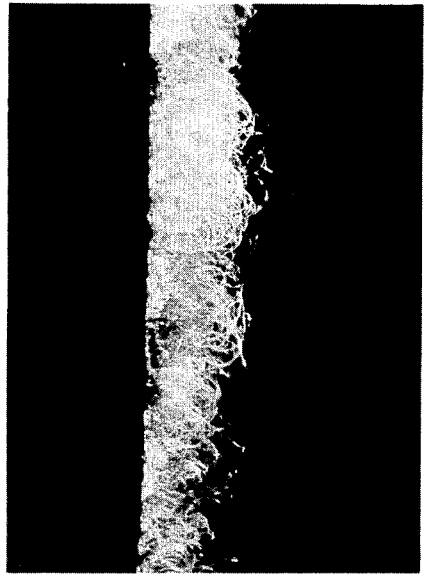
Figure 12:
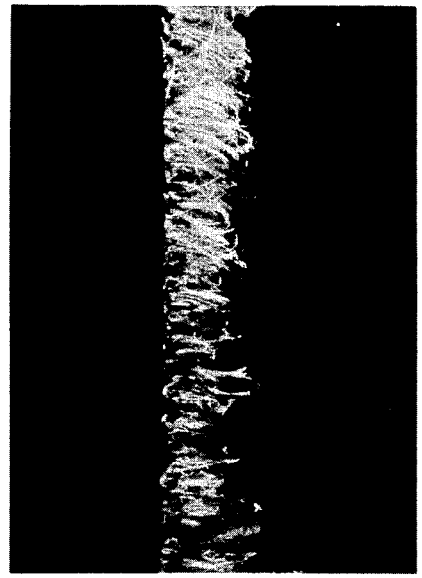

Also, not only does each fiber portion P loop outwardly from the drum surface but as the loop is formed it may twist or turn. The degree of loop twisting, and indeed, whether any twisting occurs, is dependent upon such factors as the degree of adhesive consolidation, fiber stiffness, blade angle (as hereinafter defined) and relative uniformity of loop size. In a particular situation, the formed loops may turn through an angle of up to 180°. In the form of the present invention set forth in FIGS. 11 through 20, each loop is substantially normal to the original fiber alinement. Because of the great number of fibers in the web and their proximity one to another, each fiber loop engages the neighboring fiber loops with the result that all the loops are blocked from turning beyond a plane substantially normal to the machine direction, and are constrained in that position by the interference between the loops. The arrangement of the loops normal to the machine direction is clearly evidenced by FIG. 12 which is a reproduction of an enlarged photograph of a transverse sectional view of fabric made in accordance with the method of the invention. In FIG. 11, which is a sectional view taken parallel to the machine direction and, thus, at right angles to FIG. 12, the fiber loops are viewed from their edge and for the main part are not discernible in this view as loops. In the form of the present invention illustrated in FIGS. 21 through 30, the formed fiber loops did not twist and the loops remained in the plane of the original alinement of the fibers. This can be seen from FIG. 21, which is a view taken parallel to the machine direction and shows the fiber loops in the machine direction.

FIG. 10 illustrates the partial consolidation that is desired when the open adhesive pattern is the exemplary diamond pattern. Thus, considering a single diamond S, each of the four corners T represents the crossing point of two intersecting lines of adhesive U and V. At every corner T then, as the adhesive is scraped along the surface of the drum, the crossing adhesives lines U and V are brought closer and closer together. The points closest to the corners T merge first because of the shorter distance of separation. Accordingly, point $P_5$ on line U will merge with point $P_6$ on line V before point $P_9$ will meet point $P_{10}$. Similarly, on the other side of the corner, the closer set of points (e.g. — $P_7$ and $P_8$) will merge before points $P_{11}$ and $P_{12}$. It can then be seen that, if the adhesive were allowed to scrape along the drum surface for a sufficient time period, the open pattern could be at least partially consolidated into a substantially continuous adhesive backing, as in my pending application, Ser. No. 31,225, filed Apr. 27, 1970.

However, in accordance with the present invention, the take-away speed is maintained at a rate so that the adhesive diamonds are not completely consolidated but are collapsed into flat hexagonal shapes in which the crossing points of adhesive, as shown in FIG. 10, have been transformed by partial consolidation of the adhesive into lines that form the sides of the highly elongated hexagons. As may be seen in FIG. 14 which is a reproduction of a photomicrograph of a bottom view of a fabric made in accordance with the present invention, the transverse dimension of the elongated hexagons in the discontinuous adhesive backing is considerably longer than the machine direction.

If desired, the thus-formed elastic fabric could be rolled up and stored or transported elsewhere in this closed position or could be further processed to fabricate a variety of products. Alternatively, since the take-away surface was cooled to render the adhesive non-tacky, only a certain part of the lines of adhesive that are in contact were allowed to establish bonds of any significant strength.

Figure 18:
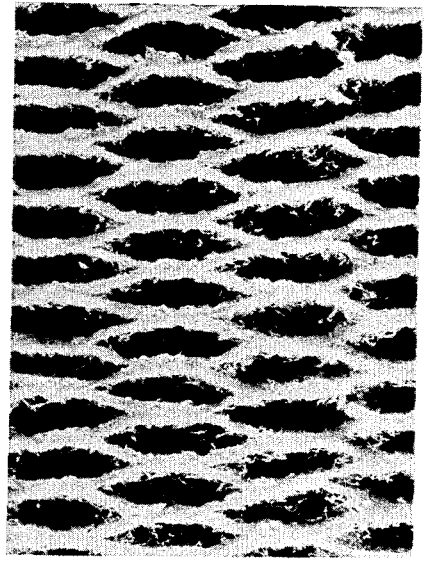
Figure 21:
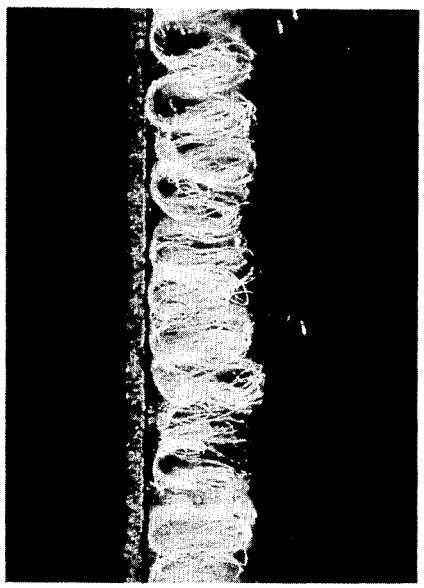
Figure 22:
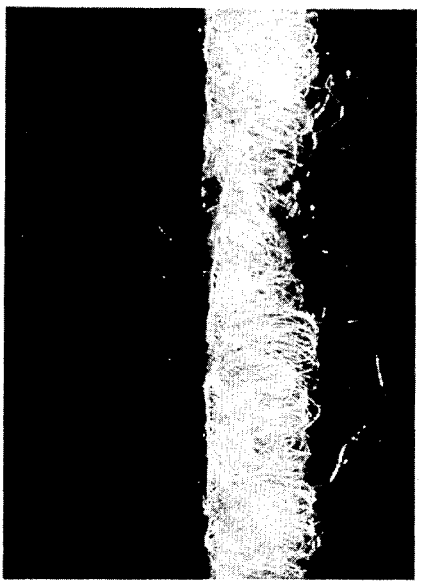
Figure 23:
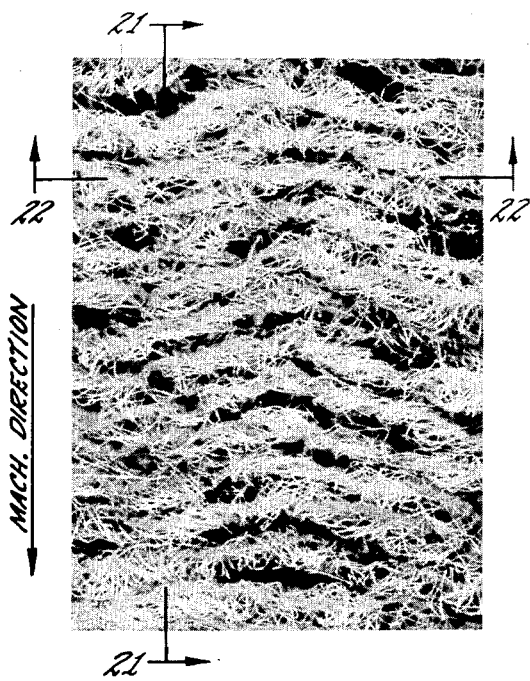

Thus, in accordance with still another aspect of the present invention, the closed, compact form of the nonwoven fabric may be stretched apart to break the bonds of minimal strength (i.e. — the bonds that will break before adhesive rupture or other degradation of the product). The fabric is then allowed to relax to come to an equilibrium state in its drawn or open position. FIG. 18, a reproduction of a photomicrograph of a bottom view of an elastic nonwoven fabric of the present invention, illustrates the open position of the discontinuous backing. The hexagonal shape of the adhesive backing is now prominent as contrasted with the collapsed shape illustrated in FIG. 14.

The drawing may be accomplished by hand and can be achieved by pulling the fabric apart (i.e. — along the machine direction). As shown in FIG. 1, if it is desired to draw the fabric immediately after it has been formed, the fabric exit end of the conveyor 42 may be provided with a roll 44 to form a nip and a pair of rolls 45, also forming a nip. Drawing is accomplished by driving the rollers 45 at a higher speed.

With respect to the loops, it should be appreciated that the heights of the fiber loops throughout the fabric vary according to the spacing between the points of attachment of each fiber to the open adhesive pattern in the base web. Referring to FIGS. 5, 8 and 9, it will be seen, for example, that the loop formed by the fiber portion $P_1$ between the points of adhesive attachment C, D will have a lower height than the loop formed by the longer fiber portion P between the points A, B.

This results in a dense fabric with the lower loops supporting and filling around the higher loops and the top surface of the fabric being formed by the tops of the higher loops. The appearance of a fabric so constructed depends not only on the height of the fiber loops but also on the type and denier of fiber used in the base web, and the depth of the fabric and the evenness of the surface may be varied by adjusting the control parameters, as will be explained hereinafter. In general, it may be said that for moderate and low-loft materials which have been produced, the fabric appears to have a uniform thickness with a somewhat uneven surface texture. With very deep high-loft fabrics, particularly when made from flexible, low denier fibers, the higher loops tend to lay one over the other providing a very soft, napped, fuzzy, fibrous surface.

Figure 24:
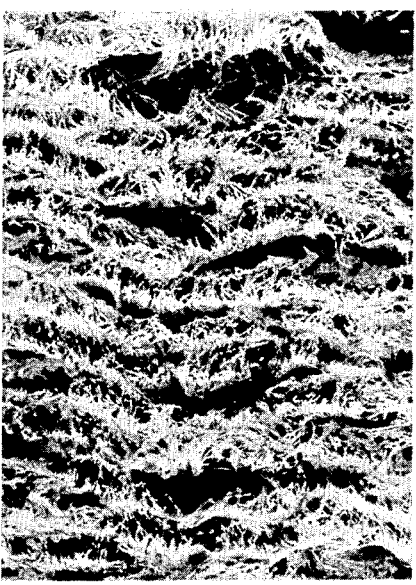
Figure 25:
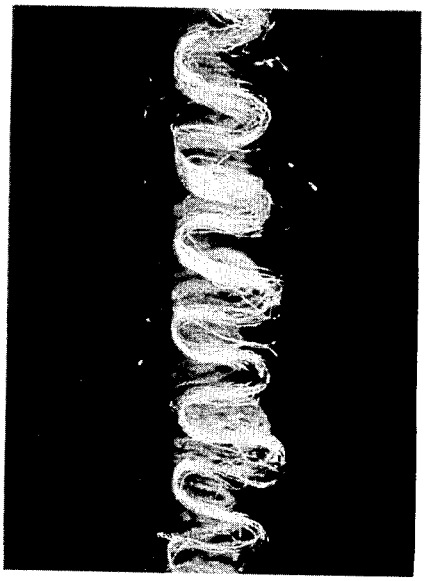
Figure 26:
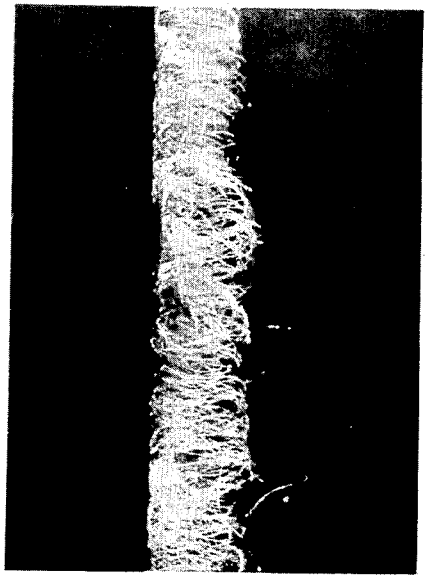
Figure 27:
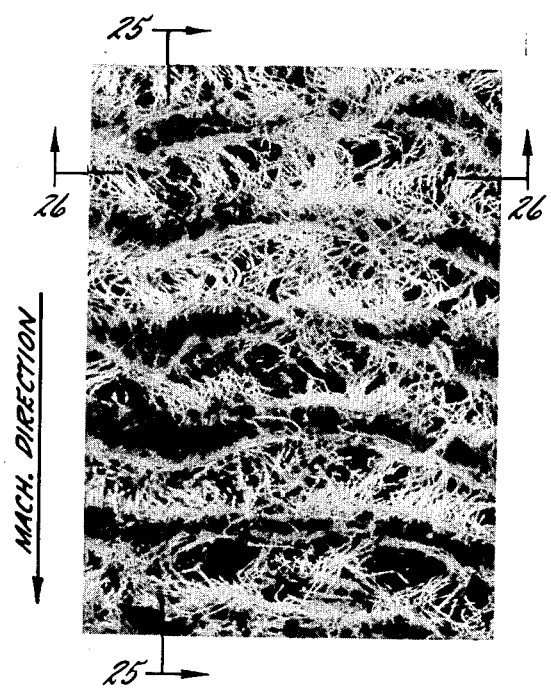
Figure 28:
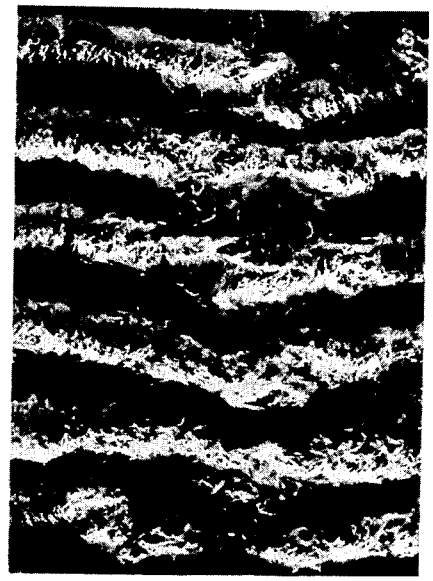
Figure 33:
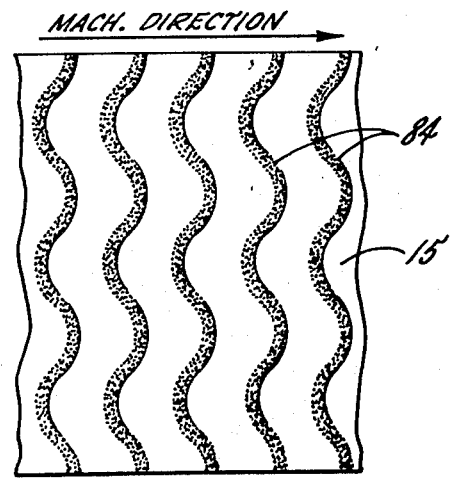

When the adhesive pattern employed provides fiber loops of the same size as in the serrated pattern shown in FIG. 33 or in other open patterns, the partial consolidation is carried out by allowing the distance between adjacent adhesive lines to be substantially decreased with even some adjacent lines or portions thereof being brought in contact with each other and adjusting the take-away speed so that any bonds developed between contacting portions of adjacent lines of adhesive can be separated by pulling the formed material apart by stretching in the machine direction without rupturing the adhesive or otherwise significantly degrading the product as regards its elastic characteristics. In the optimum situation, stretching apart will separate each line of adhesive from adjacent lines so as to again form the original pattern, force shortened (i.e. — the distance between adjacent lines of adhesive is less). While it is advantageous to minimize bonding so that no two lines will remain bonded together after stretching, it should be appreciated that some bonding can be tolerated without significantly affecting the desired elastic properties. FIG. 24 illustrates the partial consolidation of the adhesive with some adjacent lines in contact and FIG. 28 shows the return of the foreshortened adhesive pattern after stretching.

The hereinbefore described method of forming the elastic, high-loft nonwoven fabrics may be readily understood from the following examples, which are illustrative of the present invention but are not intended as limiting the scope of the invention. The apparatus of FIG. 1 was employed for forming the products described in the ensuing examples. The adhesive used was a plastisol formulation including, by weight: "Geon 135" polyvinyl chloride resin (manufactured by B.F. Goodrich, Akron Ohio), about 60 parts per 100 parts resin of "GP–261" dioctyl phthalate plasticizer (B.F. Goodrich), about 2.5 parts per 100 parts resin of "CAB-O-SIL" pyrogenic silica (Cabot Corporation, Boston, Massachusetts) and a sufficient amount of mineral spirits to bring the viscosity into the desired range (generally from about 3 to 5 percent by weight, based on the total weight of the other components for a viscosity range of 3,500 – 4,000 cps). The viscosities were measured with a Brookfield viscometer using a 4 spindle and operating at 20 r.p.m. The polyester used in the Examples was "Fortrel" Type 400 staple fibers, commercially available from Celanese Fibers Marketing Company, Charlotte, North Carolina. The approximate tenacity of these fibers is 4.8 g.p.d. with elongation at break falling in the 45–55 percent range. Other physical properties include: loop tenacity (g.p.d.)–4.4, initial modulus (g.p.d.)–40–45, yield stress (g.p.d.)–1.0, yield strain-3.7 percent, specific gravity – 1.38 and melting point – 500° F.

EXAMPLE I

The base web was made from polyester fiber having a denier of about 2.25 and an average fiber length of 2-½ inches. The polyvinyl chloride plastisol, having a viscosity of from 3,700 to 4,000 centipoises, was applied in diagonal lines one-fourth inch apart in both directions to form a diamond pattern. Rotogravure printing was employed and the intaglio roll had adhesive cells or lines 0.006 inch deep and 0.028 inch wide. The weight of the base web was about 12.8 grams/sq. yd., with equal weights of fiber and adhesive being included.

The preheat drum 29 in the first stage of forming the web was maintained at about 300° F. and operated at a surface speed of 65 ft./min. The base web 14 was thus carried to the heating drum 37 at a surface speed of 65 ft./min.

The gathering blade 38 was positioned at an angle $\alpha$ of 54° and maintained against the drum with a pressure of 27 p.s.i. The drum (9 inches in diameter) was internally heated and maintained at a temperature of about 260° F.

The take-away speed was 8 ft./min. to provide a take-away ratio (i.e. — surface speed around drum/take-away speed) of 8.125.

Figure 13:
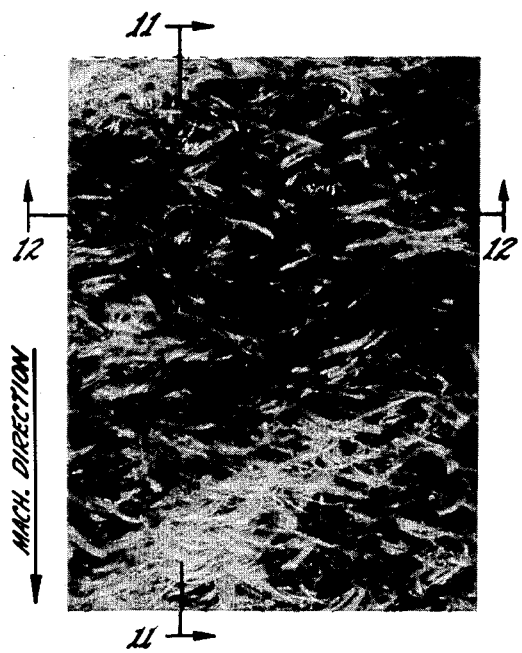
Figure 14:
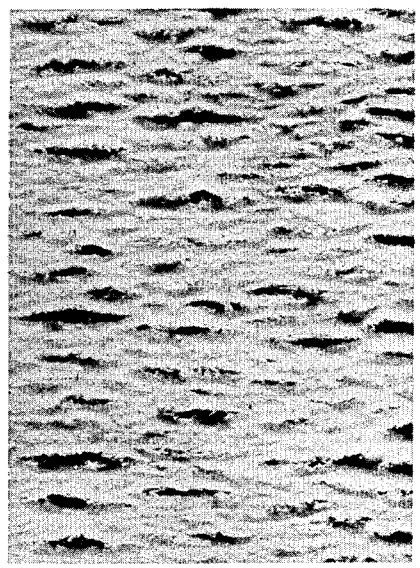
Figure 15:
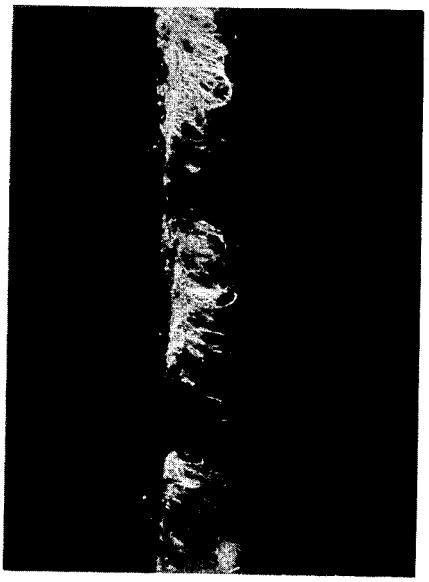
Figure 16:
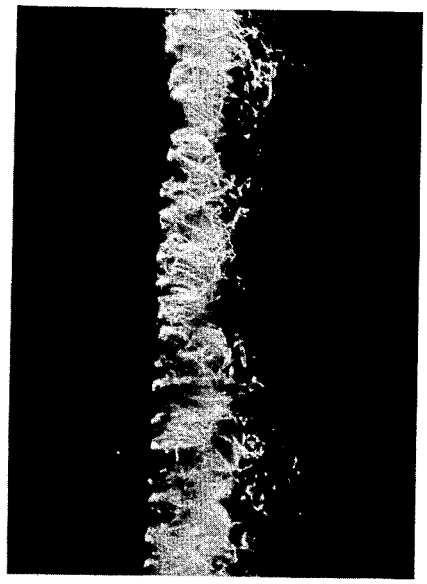

FIGS. 11 through 20 are reproductions of photomicrographs of a sample of the material which was formed. FIGS. 11 through 14 show the sample of the elastic nonwoven in its closed form. FIGS. 11 and 13 illustrates the high bulk of the product while FIG. 12 (cross-directional sectional view) shows the loops outwardly extending from the adhesive backing. The discontinuous, partially consolidated adhesive backing, characterized in its closed form by elongated, hexagonal apertures, is shown in FIG. 14.

Figure 17:
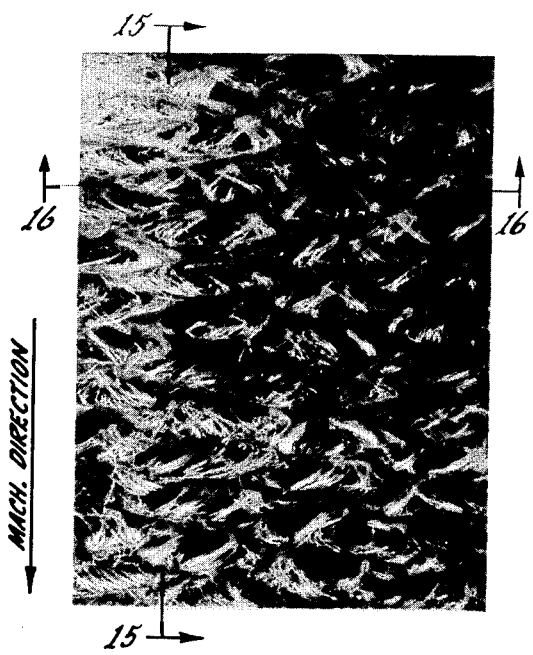

FIGS. 15 through 18 are photomicrographs of the elastic nonwoven sample of FIGS. 11–14 which has been pulled apart or stretched by hand in the machine direction to open up or draw the closed sample by breaking the weaker adhesive bonds and then allowing the sample to return to an equilibrium state. FIG. 17 demonstrates the decrease in bulk. While the fiber loops still span the discontinuities in the adhesive backing, the decreased bulk allows the backing to be partially seen below the looped fibers. As seen in FIG. 18, the elongated hexagonal pattern of the discontinuous adhesive backing of the closed form of the elastic nonwoven has opened to form a more pronounced hexagonal shape. Only a small part of adjacent merging lines of adhesive have remained bonded together and each hexagon has only two sides where two adhesive lines are boned to each other.

FIGS. 19 and 20 are photomicrographs of the elastic nonwoven sample shown in FIGS. 11–18. In this instance, the fabric has been purposely stretched (by hand to more than twice the machine direction length of the opened form shown in FIGS. 15–18) in the machine direction to the point where some of the single lines of adheisve (FIG. 20) have been broken. The elongation of the fibers is in the direction of stretch.

Before stretching to rupture, the fabric could be stretched up to about twice its opened machine direction length with a recoverability of from 80 to 100 percent. Because of the relatively small angle $\alpha$ which was employed, the adhesive pattern depth in the backing was considerably increased by the consolidation.

EXAMPLE II

Example I was repeated, except that the blade angle $\alpha$ was varied between 17° and 74° (17°, 34°, 37°, 45°, 54° and 74° being specifically used), and the weight of the base web was about 13 grams/sq. yd., with equal weights of fiber and adhesive being included.

Elastic nonwoven material capable of being stretched up to about twice its opened machine direction length with a recoverability of from 80 to 100 percent was obtained when the blade angle $\alpha$ was between about 20° and 54° (i.e. — optimum stretch was not obtained with angles of 17° and 74°).

EXAMPLE III

A higher denier fiber web was used to form the base web.

Six denier polyester fiber having an average fiber length of 3 inch was used. The weight of the base web was 15.5 grams/sq. yd., with the fiber weight being 8. The viscosity of the adhesive was about 3,800 cps.

Preheat drum 29 was maintained at about 300° F. and the heating drum 37 was maintained at about 250° F. A take-away ratio of about 5.5/1 was used. The blade angle $\alpha$ was varied from 45° to 98° (45°, 54°, 74° and 98° being specifically used).

Elastic nonwoven material capable of being stretched up to about twice its opened machine direction length with a recoverability of from 80 to 100 percent was obtained when the blade angle $\alpha$ was maintained between about 50° and 74° (i.e. — optimum stretch was not obtained with angles of 45° and 98°).

EXAMPLE IV

Figure 32:
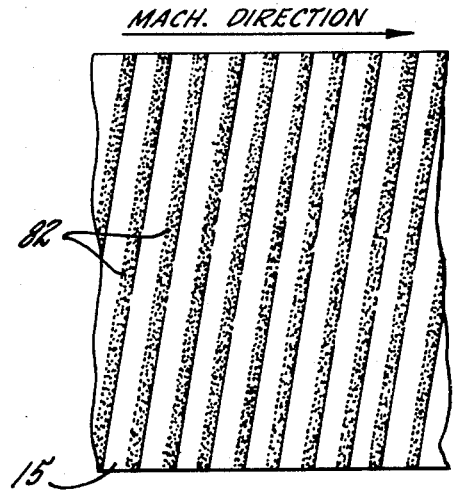

Elastic nonwoven material was formed using an adhesive pattern comprising a series of parallel lines located at 10° angles with respect to the axis of the intaglio roll. The lines were 0.504 inch apart on the roll and were 0.010 inch deep with a width of 0.035 inch. The pattern is shown in FIG. 32.

The base web was made from 6 denier polyester fiber having an average fiber length of 3 inches. The weight of the base web was 15.5 grams/sq. yd., including 8 grams/sq/yd. of fiber. The viscosity of the adhesive was about 3,900 cps.

The preheat drum 29 was kept at about 300° F and the heating drum 37 was held at about 250° F.

The surface speed of the web on the heating drum was 30 ft./min. and the take-away speed was 3 ft./min., for a take-away ratio of 10/1.

The blade angle $\alpha$ was varied from 34° to 98° (34°, 37°, 45°, 54°, 74° and 98° being specifically used).

Elastic nonwoven material capable of being stretched up to about twice its opened machine direction length with a recoverability of from 80 to 100 percent was obtained with a blade angle of 98°. The alinement of the formed fiber loops were in the planes of the original alinement of the fibers.

EXAMPLE V

Elastic nonwoven material was formed using a serrated adhesive pattern as illustrated in FIG. 33. The pattern on the intaglio roll had lines with a depth of 0.006 inch and a width of 0.028 inch. The distance between corresponding points of adjacent lines was 7/32 inch, the legs or sawtooth portions had a height of ¼, the transverse distance between corresponding points of adjacent patterns (i.e. — top of one leg to the top of the adjacent leg) was 7/16 inch.

The base web was made from 6 denier polyester having an average fiber length of 3 inch. The weight of the base web was 16.0 grams/sq. yd., including 9.5 grams/sq. yd. of fibers. The viscosity of the adhesive was about 3,900 cps.

The surface speed of the web on the heating drum was 25 ft./min. and the take-away speed was about 4 ft./min. for a take-away ratio of about 6.25.

The blade angle $\alpha$ was varied from 34° to 98° (34°, 37°, 45°, 54°, 74° and 98° being specifically used).

Elastic nonwoven material capable of being stretched up to about twice it opened machine direction length with a recoverability of from 80 to 100° was obtained with a blade angle of 98°.

FIGS. 21 through 30 are reproductions of photomicrographs of a sample of the material which was formed at an angle $\alpha$ of 98°. As can be seen from FIGS. 21 and 22, the formed fiber loops did not turn and the alinement is in the machine direction, the alinement of the original fibers.

The closed form of the material with the adjacent lines of adhesive in substantial contact is shown in FIG. 24. After the material has been stretched apart into the drawn or open form, the serrated pattern reappeared in foreshortened form. This is best llustrated in FIG. 28. Because of the relatively large angle used, the adhesive was taken off the heating drum without any significant change in the depth of the adhesive lines.

As has been thus seen from the preceding Examples, elastic, high-loft nonwoven fabrics can be made in accordance with the present invention by carefully controlling certain process parameters. Initially, the edge angle $\alpha$ must be kept within certain critical ranges, depending upon the other parameters involved such as, for example, type of adhesive pattern and fiber stiffness. Thus, while angles of from about 20° to about 120° could be employed, the critical range narrows when fiber stiffness, type of adhesive and the adhesive pattern are known. For example with 2.25 denier polyester, a polyvinyl chloride plastisol and a ¼ inch diamond pattern, a range of from about 20° to 54° should be employed. When 6 denier polyester, a polyvinyl chloride plastisol and a ¼ inch diamond pattern are employed, the range should be from about 50° to 74°. The use of 6 denier polyester with a serrated or 10° line pattern and a polyvinyl chloride plastisol require even higher angles, i.e. — about 98°. While using edge angles outside the preferred range may perhaps improve somewhat the stretchability and elasticity over the base web characteristics, it is necessary to maintain the angle $\alpha$ within a specific range to achieve the full benefits of the present invention. Thus, difficulty has been experienced in obtaining a uniform adhesive backing layer with edge angles lower than the preferred range for the specific parameters involved. This appears to be the result of insufficient relief between the blade edge and the drum surface for the fabric to flow evenly and smoothly off the drum surface as the result of the action of the blade, which produces varying degrees of consolidation of the adhesive and scattered areas where the looping is irregular tending to spoil the surface appearance of the fabric. With blades having angles $\alpha$ substantially above the preferred range for the specific parameters involved, both the problem of non-uniform adhesive consolidation and poor loop formation has been experienced.

There is also a tendency as the angle $\alpha$ of the blade edge is increased for the fabric to be formed with pronounced ridges, which may be undesirable in the finished product.

In carrying out the method using a blade having an angle $\alpha$ within the preferred range, it has been found that the fabric loft and amount of stretchability may be regulated by changing the machine direction dimension of the adhesive pattern. Thus, by increasing this dimension, the height of the loops may be increased, thereby increasing the fabric loft. Larger diameter fibers, strands or yarns may also be used as the elements of the base web to produce heavier, carpet-like finished fabrics. The adhesive and its pattern of application must, however, take into consideration the amount of adhesive required to form the discontinuous backing layer under the consolidating action of the gathering blade and sufficient adhesive must be present to provide a layer of sufficient thickness to obtain strong attachment of the loops in the finished fabric.

The Examples also illustrate the importance of the take-away speed of the fabric from the blade edge. With blade 38 having an edge angle $\alpha$ within the preferred range, and assuming the take-away surface is cooled to substantially an ambient temperature (i.e. — 75° F to 80° F), the normal ratio of the surface speed of the heating drum 37 to the take-away speed should be maintained in the range of from about 5:1 to about 10:1, with a ratio of 7 to 8:1 being preferred. By increasing the ratio above 10:1, by slowing down the fabric take-away speed, more adhesive consolidation has been obtained and the mass of the fiber loops is made somewhat more dense, so that a fabric with a higher weight has been produced; but the adhesive lines become more strongly bonded together so subsequent drawing cannot open the adhesive. By increasing the fabric take-away speed, such that the fabric is not allowed to gather at the blade edge, the fabric will be drawn or extended while the adhesive layer is still in a plaastic condition, thereby opening the adhesive layer, but not allowing sufficent residence time for the fibers to be heat set.

Further parameters that affect adhesive consolidation, fiber looping at the blade edge and the stretchability and elasticity characteristics of the elastic nonwoven fabric are the adhesive pattern applied to the fibers in the formation of the base web, the adhesive weight as a percentage of the weight of the web, and the area of the web covered by the adhesive pattern. The adhesive was applied in the preparation of Examples I through III in the form of diagonal lines, criss-crossed, to provide an open diamond pattern with the size of the opening in the diamond in the machine direction less than the lengths of the fibers used for the base webs. Thus, where "Fortrel" T-400 polyester was used, with fiber lengths of from 2½ inches to 3 inches, a ¼ inch diamond pattern applying adhesive to 20 to 25 percent of the total web surface was found effective.

Figure 31:
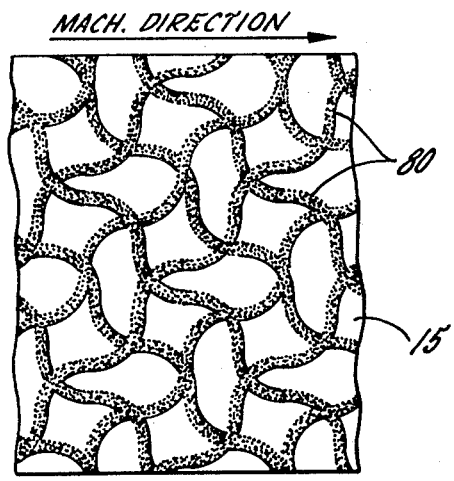

Other adhesive patterns which may be used include unevenly spaced lines of application such as criss-crossed sine waves 80, as shown in FIG. 31. The spacing of such lines of adhesive may furthermore be increased or decreased to change the maximum height of the element loops and thus the dpeth and surface texture of the finished material.

Figure 34:
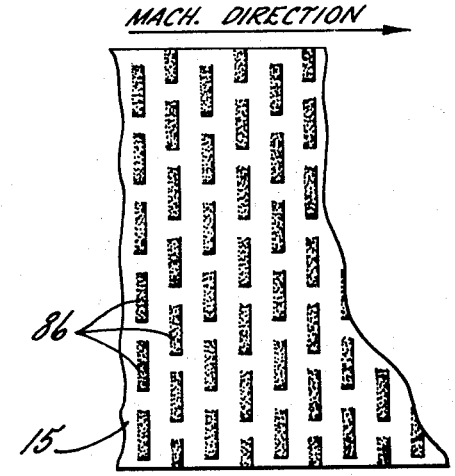

The loops of the fabric will have varying heights when criss-crossed lines of adhesive are used, due to the different spacings of the points of attachment (A, B, C, D — FIG. 8) of the base web elements to the adhesive. To produce a fabric with loops of uniform height, the adhesive is applied to the base web 14 in lines evenly spaced apart and extending across the web. Furthermore, the spacing between the lines of adhesive may be increased or decreased to obtain a higher or a lower pile height, as desired. Referring to FIG. 32, one such adhesive pattern is illustrated in the form of evenly spaced diagonal lines 82. Another such adhesive pattern is illustrated in FIG. 33, in the form of lines 84 shaped in a sine wave. A brick pattern is another such pattern as shown in FIG. 34. With all such patterns, if broken lines of adhesive are utilized as in FIG. 34, to obtain element looping, the gaps in the lines of adhesive 86 should be staggered such that the web elements longitudinally span the spaces between the adhesive lines and are securely attached to the adhesive.

When the spacing of points of attachment of the fibers to the adhesive varies regularly over the area of the base web as, for example, when an open diamond pattern of adhesive is used the loops in the finished fabric will vary in height in a regular manner to provide a uniformly varying surface having a textured appearance. When, on the other hand, an open pattern of adhesive is used in which in the cross direction of the base web the lines of adhesive are parallel, or evenly spaced, it will be seen that the spacing of points of attachment of the elements to the adhesive will be uniform over the total area of the fabric, and the loops in the finished fabric will be of uniform height to provide a more even surface. The appearance of such a surface will, of course, be affected by the characteristics of the elements which form the loops. Thus, where the elements are yarn or heavy strands of fibers, the loops will be clearly visible, while where the elements are small diameter, flexible fibers, the surface will have a fibrous appearance, the fiber looping being less evident.

As seen in Examples IV and V, the transverse adhesive lines, when consolidated by the action of the gathering blade in accordance with the method of the present invention, are moved into proximity or abutment with each other but are only minimally bonded together. Thus, when the closed form of the elastic nonwoven is opened, the original pattern will reappear but will be foreshortened (i.e. — the machine direction distance of the pattern will be less).

In the application of the adhesive to the base web, it has been observed that by increasing the adhesive viscosity a sharp, distinct printed pattern will be obtained such that the fibers are securely attached to the adhesive at distinct spaced points and are not embedded in adhesive throughout their length. It is desired to have spaced points of fiber adhesive attachment so that the fiber loops will be distinctly and separately formed at the gathering blade so as to extend outwardly from the bonding adhesive layer. Fiber sizes between 1-½ denier and 15 denier have been successfully utilized in the base web with a ¼ inch diamond pattern of adhesive. With higher denier fibers, or with strands or yarns used in the preparation of the base web, the adhesive pattern should be enlarged to insure attachment to the adhesive at spacings along the length of the threads or yarns which will define the depth of pile or degree of loft in the finished material. With the light weight webs of polyester used in the Examples, the ratio of fiber to adhesive was approximately 1:1. It has been found that the degree of adhesive-fiber attachment in the base web was affected when the fiber to adhesive ratio with such type fibers was substantially increased above 1:1, so that the fiber loops did not form properly at the blade nor did the fibers have sufficient attachment to the adhesive layer in the finished fabric. On the other hand, increasing the relative amount of adhesive in the base web had the result of producing a thicker adhesive layer in the finished material and more secure fiber attachment but the adhesive lines tend to disperse so that the pattern becomes less open affecting the height of the loops, which is undesirable. The fiber-adhesive ratio will be different, however, for base webs of yarns and threads where it appears that less amounts of adhesive, relatively speaking, will provide adequate attachment of the loops to the adhesive backing layer.

While staple length "Fortrel" T-400 polyester fibers were used for the preparation of the fabric in the Examples, it should be noted that these specific examples were given to illustrate the effect of varying various control parameters on the nature and quality of the finished material without implying that the process is in any way limited to this particular type of fiber. Any material can be utilized for the fibers as long as it is "heat-settable." By this it is meant that the material will maintain the looped configuration into which it has been formed in accordance with the present invention, regardles of whether the stability of the loop may be attributed to what is technically considered heat-setting or whether the setting is the result of some other phenomena. Representative examples of suitable materials include any of the commercially available acrylic fibers such as, for example, "Creslon" (American Cyanamid, Stamford, Connecticut) and "Orlon" (E.I. du Pont de Nemours and Company, Wilmington, Delaware) and olefins such as polypropylene. If desired, a blend of fibers may be used in which only a portion of the fibers are heat settable. This will not, of course, provide the optimum elastic properties. Moreover, not only highly drafted webs and carded webs of staple length fibers may be used for the base but also garneted and air laid webs of such fibers as well as directly laid alined webs of mono-filament. It has been noted, however, that when webs such as carded webs are used for the base web in which an important proportion of the fibers are randomly oriented, those fibers not alined with the machine direction appear to interfere with the loops production by the gathering blade and the ultimate stretch characteristics. The most regular formation of loops and optimum elastic and stretch in the formed fabric has been produced with those base webs having the highest proportion of fibers alined with the machine direction as, for example, the highly drafted webs made with the apparatus illustrated in FIG. 1.

It is also contemplated that flexible threads, yarns, or strands formed from heat-settable materials may be used for forming a base web. To obtain regular loops of such elements in the finished material, it is clear that substantially all such elements should be parallel and extending longitudinally of the web, for loop formation will be interfered with by those elements that substantially depart from such longitudinal alinement.

It is also recognized that to produce a material in accordance with the invention, the elements should be sufficiently flexible to allow the loops to form under the action of the adhesive consolidating and gathering blade. Thus, neither stiff strands which do not loop under the action of the gathering blade, nor multiple strand yarns in which the lay of the strands opposes the tendency of the loops being formed to assume their equilibrium position under the action of the blade, will satisfactorily serve as elements of the base web when it is desired to produce a fabric fully in accordance with the invention.

The method in its preferred form involves the preparation of an adhesive bonded highly drafted base web, and the adhesive consolidation and fiber looping accomplished by the cooperating action of the gathering blade 38 and the forming drum 37. Preliminary steps in the base web formation, and subsequent steps for processing the fabric after it flows from the gathering blade, also may be carried out to alter the characteristics of the finished fabric.

Referring to FIG. 1, as has been previously described, the base web may be formed of webs from two drafting frames 12, 25 supplied with staple length fibers. If desired, patterns of color or of different fibers from the main constituent of the fabric may be introduced into the finished fabric by utilizing certain preliminary steps in the formation of the base webs.

Thus, for example, the under web from the first drafting frame 12 may be made from fibers of a solid color while at spaced intervals across the base web, bands of one or more colors may be introduced by passing colored fibers through the second draw frame so that the colored fibers are laid on the under web. The top layer of fibers may be applied in the pattern desired and it has been found, will effectively screen out the under web color in most instances so that the finished material will display a striped appearance.

The top layer of fibers from the draw frame 25 may also be introduced in a wavy or saw tooth pattern to produce either a wavy or saw tooth effect completely across the fabric, as illustrated in FIG. 2, or in bands across the fabric as desired.

Alternately, the under layer of the base web may embody different colored fibers by having the fibers at the margins, for example, of one color while the fibers across the center of the web are of a different color.

Accordingly, different colored fibers may be introduced through either or both draw frames. The top layer of fibers may be in the form of spaced bands of fibers across the web, or the different colors may be introduced through only the second draw frame 25, by laying down a uniform layer of fibers in which alternate slivers are of different colors; where the top layer of the base web comprises spaced bands of fiber, it will be seen that the finished fabric will have a varying weight across the web, with a double weight and a more dense mass of loops in the bands where the top fibers are laid down.

Other procedures may be used for introducing patterns into the finished fabric. For example, a layer of fibers in the form of a section of a web may be laid on a web from the first draw frame 12, or onto a carded web under layer. Due to the consolidation operation performed by the gathering blade, the pattern will be shortened lengthwise but not appreciably disarranged laterally such that whatever the pattern introduced into the top layer of the base web it will appear in the finished web in its fore-shortened form. A pattern of fibers may be introduced into the top draw frame 25, which will operate to aline the fibers and will draw or extend the pattern. The subsequent shortening effect by the gathering blade will tend to reduce the pattern to its original form.

As shown in FIG. 1, the fabric is carried along the take-away surface 41 by the action of the conveyor 42. Since the adhesive backing is hot and tacky as the fabric flows onto the take-away surface 41 which is maintained substantially at ambient temperatures, that surface may be treated with a non-stick or release coating to insure that the fabric may be drawn smoothly along the surface.

To cool the belt of the conveyor 42 and prevent it from becoming overheated from the hot adhesive back of the fabric 40, streams of air may be blown against the underside of the belt from suitably placed air nozzles 54. This will also serve to cool the fabric 40, although it may be necessary or desirable to pass the fabric through a cooling station or zone to cool the adhesive and thermoplastic fibers clearly below their softening temperatures or to eliminate tackiness of the adhesive.

Another procedure for treating the fabric 40 involves laminating it to a backing material, such as an open scrim for reinforcing purposes, or to a layer of foam rubber for increasing the thickness and resiliency of the fabric, or to itself for providing a fabric with a deep loop pile on both front and back surfaces.

While the foregoing additional process steps involve treatment of the back of the fabric 40, it is also contemplated that the surface of the fabric 40 may be subsequently processed. The material may be embossed to provide desired surface texture or appearance or dyed or printed or otherwise colored or ornamented.

I claim as my invention:

1. A stretchable, high-loft, nonwoven fabric comprised of a multiplicity of outwardly looped flexible elements, with the ends of each loop embedded in a flexible, partially consolidated, discontinuous gathered adhesive backing layer; said backing layer having been formed by gathering and partially consolidating longitudinally spaced, transversely extending, softened adhesive bands having said flexible elements embedded in separate bands of adhesive at spaced points on said elements while outwardly looping the portions of said elements between said points.

2. An elastic high-loft, nonwoven fabric comprised of a multiplicity of outwardly looped heat-set flexible elements, with the ends of each loop embedded in a flexible, partially consolidated, discontinuous, gathered adhesive backing layer; said backing layer having been formed by gathering and partially consolidating longitudinally spaced, transversely extending, softened adhesive bands having said flexible elements embedded in separate bands of adhesive at spaced points on said elements while outwardly looping the portions of said elements between said points.

3. A fabric according to claim 2 wherein said backing layer comprises a series of interconnected hexagons.

4. A fabric according to claim 3 wherein two oppositely disposed sides of each hexagon are bonded to a side of adjacent hexagons.

5. A fabric according to claim 2 wherein said loops lie in planes extending in the cross direction of the fabric.

6. A fabric according to claim 2 in which the spacing of said points is substantially uniform for said elements throughout the fabric so that said loops have a substantially uniform height.

7. A fabric according to claim 2 wherein the spacing of said points varies regularly for said elements throughout the fabric so that said loops vary in height regularly throughout the fabric.

8. A fabric according to claim 2 wherein said bands form a serrated pattern.

9. A fabric according to claim 2 wherein said bands are substantially straight lines positioned at an acute angle with respect to the transverse dimension of the fabric.

* * * * *